United States Patent [19]

Bucek

[11] Patent Number: 4,510,711
[45] Date of Patent: Apr. 16, 1985

[54] DECORATIVE FLY-SWATTING DEVICE

[76] Inventor: David C. Bucek, 324 Lazy La., Wharton, Tex. 77488

[21] Appl. No.: 491,906

[22] Filed: May 5, 1983

[51] Int. Cl.³ .............................................. A01M 3/02
[52] U.S. Cl. .................................. 43/137; 16/110 R; 128/327
[58] Field of Search .................. 43/137, 110; 128/327; 16/114 B, 125, 127, 110 R; 7/167; 81/180 R

[56] References Cited

U.S. PATENT DOCUMENTS

| 1,261,222 | 4/1918 | Earles | 43/137 |
| 1,342,974 | 6/1920 | Smith | 43/137 |
| 1,509,489 | 9/1924 | Rochwite | 43/137 |
| 1,566,235 | 12/1925 | Sheehan | 128/327 |
| 2,134,193 | 10/1938 | Klie | 43/137 |
| 3,031,794 | 5/1962 | Zalkind | 43/137 |
| 4,120,115 | 10/1978 | Mushkin | 43/137 |
| 4,242,828 | 1/1981 | Schurger | 43/137 |

FOREIGN PATENT DOCUMENTS 248681 3/1926 United Kingdom .................. 43/137

Primary Examiner—Gene P. Crosby
Attorney, Agent, or Firm—Charles W. McHugh

[57] ABSTRACT

A multi-purpose tool having the external configuration of a flyswatter when in its assembled condition. The tool has a generally planar blade with an approximately rectangular shape and which is generally devoid of perforations. A single aperture near one edge of the blade is adapted for receiving a mechanical fastener. The blade is formed of a leathery material having sufficient stiffness as to be essentially self-supporting. A rigid handle, preferably of a hard wood such as oak, has a length about three times as long as the length of the blade; and one end of the handle has a longitudinal slot of sufficient thickness to snugly receive the blade. A transverse bore extends through the handle at a location to coincide with the blade aperture when the blade is inserted fully into the slot. A mechanical fastener is inserted into the handle's bore so as to removably attach the blade to the handle. A leather thong is inserted through an aperture in the second end of the handle. The thong is preferably about two feet long, so that the combination of the thong and the handle can function as a tourniquet.

4 Claims, 7 Drawing Figures

U.S. Patent   Apr. 16, 1985   4,510,711
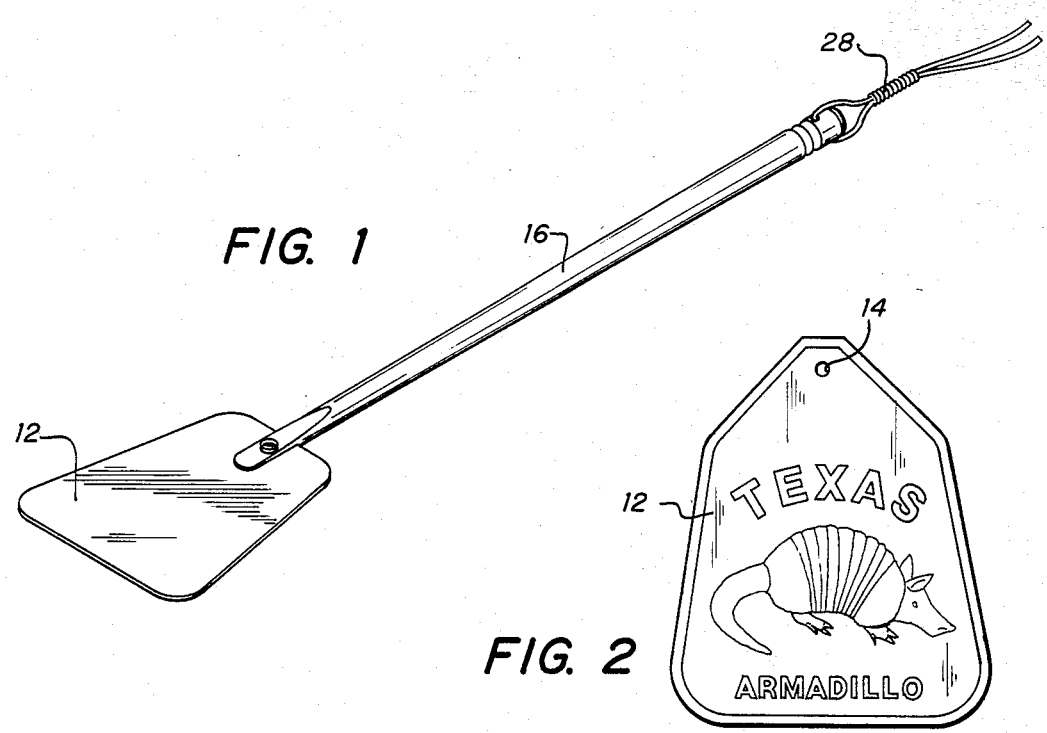
FIG. 1
FIG. 2
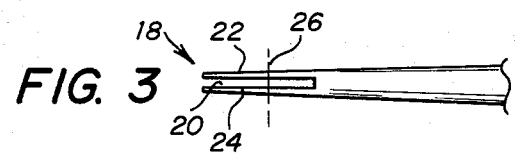
FIG. 3
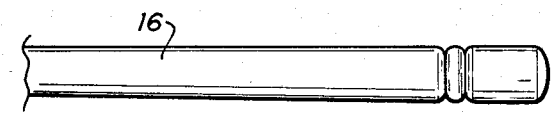
FIG. 4
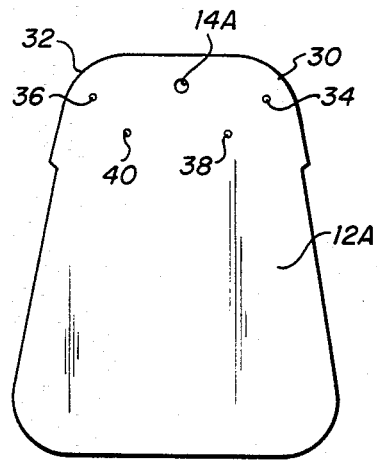
FIG. 5
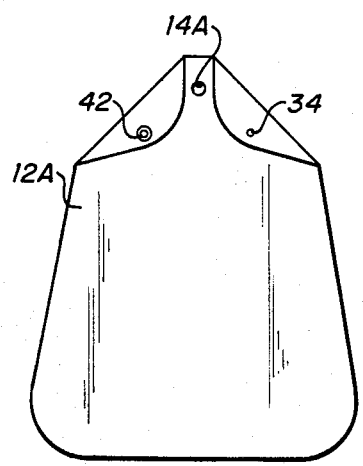
FIG. 6
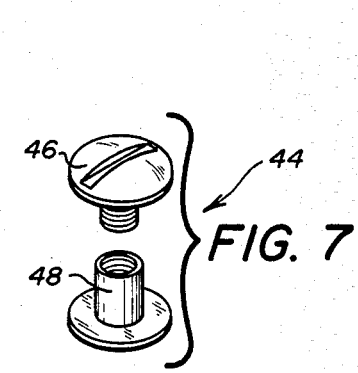
FIG. 7

DECORATIVE FLY-SWATTING DEVICE

BACKGROUND OF THE INVENTION

This invention relates generally to tools which are adapted for manual manipulation, and more particularly to a category of tools which constitute devices for striking a fatal blow to small insects—which are commonly called "flyswatters". More specifically, the invention relates to a tool which can function as a flyswatter when assembled, and which can be disassembled to serve a variety of other purposes.

For many years mankind has been plagued by flying insects, and has sought to deal with the problem by creating tools which are particularly adapted for hitting or swatting such insects. Because the common household fly has been a particularly bothersome pest, many such tools have been frequently referred to as flyswatters. One of the characteristics of such flyswatters, however, is their rather distinctive shape and size—which renders them almost immediately recognizable as tools for dealing with the problem of flying insects. To openly display such a tool within plain sight in a person's residence is almost a tacit admission that the person has a sanitation problem that cannot be discreetly handled. In other words, to openly display a flyswatter in a kitchen may be considered by some persons as being similar to leaving a rat trap exposed for visitors to see. It is therefore more common for people to store an old-style flyswatter in a concealed location where it is out of sight and does not advertise the existence of a problem. Regrettably, when there is a legitimate need for using a flyswatter, it may not be as handy as might be desirable; and the time that is consumed in going to a remote location to retrieve a stored flyswatter may give the bothersome fly an opportunity to land on some exposed food, etc.

It is believed that flyswatters are very practical tools, and it is also believed that they would be more readily tolerated as "sociable" household tools if only they were more attractive. That is, if flyswatters could be made more sanitary and more decorative, it is believed that they would find more acceptance in many rooms in people's houses and offices. Accordingly, it is an object of this invention to provide a flyswatter which is sufficiently attractive as to be kept readily at hand in many rooms in a dwelling.

Another object is to provide a sufficiently sturdy and functional flyswatter that it may serve purposes other than simply killing flies. For example, a person may decide to forego use of the tool described herein as a flyswatter—and instead use it as a personal hand fan. This would be entirely feasible because the device disclosed herein has a blade which is devoid of the perforations which have been characteristic of previously known flyswatters. Surprisingly, the absence of such perforations does not seem to significantly interfere with the ability to kill flies, if a person is determined to use the device as a flyswatter. As long as the blade is made of a smooth and generally planar material like leather, the device is capable of killing flies.

Another advantage of having a smooth, non-perforated material for the blade of the device is that it provides a relatively large area upon which decorative matter may be placed—which adds to the social acceptability of having the device within plain view and not hidden in some remote closet. For example, if a smooth leather blade has embossed thereon the mascot of some school, than an alumnus of that school can feel more comfortable in publicly displaying the blade (and its attached handle) as a way of showing his school spirit, etc.

Such a smooth leather blade can also be used for other advertising and/or promotional purposes in presenting company logos, etc., such that a flyswatter of this type could be utilized as a so-called specialty advertising item. It could also be used to promote certain events (such as a world's fair) or a tourist attraction (such as a theme park or other entertainment facility). Unlike some other souvenirs or gift items, the device of this disclosure can—when necesssary—be constructively used for a beneficial purpose, instead of simply looking attractive and providing a memento of someone's visit to a particular city or vacation spot.

Besides being functional in its assembled condition, the device of this disclosure is capable of being manually disassembled without the need for any special tools, such that the blade may be separated from the handle in a relatively easy fashion. When the blade is made of leather, it can serve as a very acceptable coaster upon which hot or cold beverages may be placed in order to avoid damage to a table or other furniture. The handle is preferably of wood and is typically strong enough, and long enough, to serve adequately as a back scratcher. Hence, the construction to be described is intended to satisfy many personal needs in a manner which makes it socially acceptable and particularly beneficial for both comfort and cleanliness. Other uses and benefits of the device will be apparent from a reading of the specification and the claims appended thereto, and from a study of the figures of the drawing which are attached hereto.

DESCRIPTION OF THE DRAWINGS

FIG. 1 is a perspective view of the tool disclosed herein—in its assembled condition, so that it may serve as a flyswatter, etc.;

FIG. 2 is a top plan view of a flyswatter blade like the one shown in FIG. 1, but which is decorated by being embossed with an exemplary design;

FIG. 3 is a fragmentary side elevational view of an exemplary handle which is generally round in cross-section, such that the handle may be described as being both elongated and generally cylindrical;

FIG. 4 is a fragmentary side elevational view of an alternate handle which has essentially flat surfaces on its top and bottom, such that a transverse cross-sectional view would more nearly approximate a rectangle;

FIG. 5 is a bottom plan view of a second embodiment of a leather blade in its "as-cut" condition;

FIG. 6 is another view of the blade shown in FIG. 5 with the two "ears" being folded over where they can be held with a rivet or the like; and FIG. 7 is an exploded view of an exemplary mechanical fastener for use in holding the blade securely to a handle.

DETAILED DESCRIPTION OF THE PREFERRED EMBODIMENTS

Referring initially to FIG. 1, a preferred embodiment of the combination tool 10 has the external configuration of a flyswatter when in its assembled condition. That is, it has a generally planar blade 12 which has an approximately rectangular shape. Referring additionally to FIG. 2, the blade 12, which is preferably of good-quality leather, is shown alone and prior to being affixed to a handle. The blade 12 is generally devoid of perforations, but it does have a single aperture 14 near one edge which is adapted for receiving a mechanical fastener. The blade 12 is preferably formed of leather or a material having the characteristics of leather (i.e., one of the simulated leathery materials that has the appearance and "feel" of leather). One reason for preferring leather for the blade 12 is to provide a material that is good-looking, durable and capable of serving as a heat insulator—when the blade is to be utilized as a coaster or trivet. Additionally, real leather is particularly adaptable to being decorated by either embossing or silk-screening. The thickness of the blade 12 is ideally about 1/10 inch, so that the blade can fit within a slot that is created in a wooden handle by a standard circular saw. However, blade thickness up to 11/64 inch may also be advantageous when a particularly heavy piece of leather is desired—primarily for aesthetic rather than functional purposes. So-called "carving leathers" rated in the range from 4 to 11 ounces are suitable for use in the construction disclosed herein, with the slightly heavier leathers being generally preferred because they are more nearly self-supporting. That is, when a blade is supported in a cantilevered fashion by a horizontally positioned handle, a preferred leather will extend in almost the same plane that is defined by the handle—with relatively little drooping or sag. In other words, the preferred material for the blade 12 has sufficient stiffness so that the device can be utilized as a hand fan. Of course, if it is to function as a fan, the minimum area of the blade should be about 25 square inches.

Referring still to FIG. 1, the tool includes a rigid handle 16 having a length which is preferably in excess of one foot and ideally about 18 inches. Referring additionally to FIG. 3, the handle's first end 18 has a longitudinal slot 20 of sufficient thickness to snugly receive the blade 12 within said slot. As shown, the orientation of the slot 20 is generally parallel to the longitudinal axis of the handle 16 so as to create two cantilevered end portions 22, 24 that lie respectively above and below the slot. The bifurcated end 18 has a transverse bore, identified by the axis 26, at a location so that it will coincide with the blade aperture 14 when the blade 12 is inserted fully into the slot 20. The diameter of this bore through end portions 22, 24 is preferably about 3/16 inch, which is sufficiently large as to receive a very sturdy mechanical fastener, but which is not so large as to unduly weaken the first end of the handle.

The handle 16 shown in FIG. 3 has a generally round cross-section which has a particularly pleasing appearance and "feel"; when such a "round" handle is made of oak and has a maximum diameter of about ¾ inch, it will typically weigh about two ounces. Another handle 16A having generally flat top and bottom surfaces is shown in FIG. 4. An ash handle approximately 18 inches long and having an approximately rectangular cross-section of ½×⅞ inch (at its second end) will typically weigh about two ounces. Also shown in FIG. 4 is another capability of the handle—which is to securely hold a common clothespin in such a way that the handle becomes a very convenient tool for reaching awkward places. For example, if a person must reach deeply into a furnace to light a pilot light, a handle 16 or 16A can be combined with a clothespin, and the clothespin can safely hold a lighted match—so that the person does not have to put his arm into a region that may be hot, dirty or cramped, etc. The bifurcated first end of a handle is also aptly sized to securely hold a small mirror of the type that many women routinely carry in a purse. When such a mirror is wedged in the slot 20, the handle 16 becomes a part of a very useful tool for examining a remote corner of a cabinet or the underside of a plumbing fixture, etc. After its temporary use as an auxiliary holder, it should be apparent that the handle can be quickly restored to its role as a part of a fly-swatting device. Also, a leather strap may conveniently be placed through a bore near the second end of a handle (represented by axis 27) to facilitate the act of hanging the device 10 on a wall or carrying it from place to place.

Referring next to FIG. 5, an alternative configuration for a blade 12A is shown, with two "ears" 30, 32 shown in their flat (i.e., unfolded) condition. A first set of holes 34, 36 are provided near the outer edge of the blade 12A, and another set of apertures 38, 40 lie internally of the blade 12A. By folding an ear 30 so that hole 34 is juxtaposed with hole 38, as shown in FIG. 6, a fastener (such as rivet 42) can be passed through the juxtaposed holes in order to hold an ear in a folded condition. Such a permanent fold in the preferred leathery material can serve as a kind of "cushion" to preclude any abrasive contact between the handle and an object that is being struck. A mechanical fastener 44, consisting of an externally threaded shank 46 and an internally threaded barrel 48, can be passed through the aperture 14A so as to secure the blade 12A to a handle. Such a mechanical fastener is shown (slightly enlarged) in FIG. 7. While a common screwdriver can be used to tightly engage the matching threads of the elements 46, 48, the fastener does not necessarily require tightening with a tool; and, when loosely connected, the relatively large flanges on the fastener 44 permit it to be disassembled with only manual manipulation. Hence, the device 10 shown herein can be assembled and disassembled without the need for any special tools. If desired, the bore in the first end of a handle (associated with axis 26) can be counter-bored so as to ensure that a head or flange on a fastener 44 may be at least partially concealed by the handle material.

The ease of both assembly and disassembly would permit a person to change a blade at any convenient time, and even switch from one blade to another—if only a single handle but several blades are owned by one person. Also, even a relatively porous leather can be waterproofed by coating it with an appropriate compound, such that the blade could be repeatedly washed after being used as a flyswatter. A preferred waterproofing compound is made by mixing one gallon of neat's-foot oil with one or more gallons of a Coray lubricating oil sold by Exxon Company, Box No. 2180, Houston, Tex. Applying such a neat's-foot compound to the napped side of the leather blade 12 will contribute to durability of the blade as well as making it more nearly waterproof.

The absence of any large number of perforations across the face of a blade means that there is not likely to be a crevice where part of a dead fly might be wedged, etc. That is, the relatively smooth bottom surface for the blade 12 more nearly ensures that it can be kept clean and free of any evidence of its use as an exterminating device. Therefore, the device 10 can be used without reservation in ways that are unrelated to swatting flies. In addition to use as a flyswatter or fan, the device 10 could—if necessary—be used to discipline a young child that presumably needs a spanking. While the concept of spanking children in order to enforce some parental rule is not universally accepted by all so-called experts in child rearing, there are still those who favor spanking as a way of persuading a child to behave in a desired manner. And, if a child is to be spanked, it is probably preferable that he be spanked with a relatively wide object (like blade 12) rather than a narrow switch or belt. So, while the practice of spanking is not necessarily endorsed, it is a realistic use for the device.

Another use for a disassembled part of the device 10 includes using the handle 16 or 16A as a back scratcher. Adding a deformed paper clip to the first end 18 can also provide a hook which could be utilized to help fasten a zipper on the back of someone's dress—when no one else is around to offer assistance at dressing time. And, as suggested earlier, the possible disassembly of the device 10 makes it feasible to use a blade 12 as a coaster or trivet.

One advantageous use for a leather thong 28 is to hold a single key that is alternately used by two or more persons. The long wooden handle (and attached blade) then becomes a relatively large key fob, which has a sufficient size as to preclude one person from absent-mindedly pocketing the key and then carrying it to some remote spot—so that others who need the key cannot find it. For example, if there is only a single key to an office restroom, placing that key on the leather thong can ensure that the key will not accidentally put in someone's pocket and removed from the premises.

In the preferred embodiment, the leather thong 28 has a width of about 3/16 inch, i.e., slightly wider than a typical leather shoelace; and it has a length of about two feet. Such a leather thong is ideally suited for functioning as a tourniquet in the case of an emergency where a flow of blood needs to be inhibited. Removing the leather thong 28 from the handle and tying it in a loop around the body member which is bleeding serves to put the leather thong in condition to be twisted by the handle in a fashion that is similar to standard first-aid practice. To periodically permit the flow of fresh blood to the injured member, the handle 16 can be temporarily untwisted, and then quickly restored to its position for restricting blood flow. While there may be devices in some first-aid kits that are more efficient as tourniquet devices, it is probably all too true that relatively few homes and offices have adequate first-aid equipment. So, at least some kind of a tourniquet device around the house would be better than none at all.

While a full-sized flyswatter 10 is likely to be more popular—because of its many functional and decorative uses, there is also a possibility of a "mini" flyswatter that would admittedly be somewhat small for swatting flies. Such a mini-flyswatter could be about one-third the size of a conventional flyswatter and yet still have many decorative features. The thickness of any polished or glazed leather would likely be much thinner than the tanned leather for a full-sized device 10. Leather rated as 3 to 3½ ounces could probably be inserted into a slot made with a sawblade 1/16 inch thick. The thong 28 for a mini-flyswatter can still be about two feet long, because its apparent bulk can be minimized by coiling it in such a way that it does not hang from the second end of the handle in an obtrusive manner. Even a small handle for a mini-flyswatter should probably be at least six inches long, if it is to serve as a part of a tourniquet device; otherwise, the handle might not be suitable to twist a thong 28 as tightly as might be desirable.

The preferred shape for blade 12 is shown in FIG. 2, and the dimensions for a full-sized device 10 are as follows: the distal part of the blade has a width of about five inches, the pendant part of the blade (just ahead of the handle) has a width of about four inches, and the total length of a blade is just slightly more than six inches. Such a blade made of 9-ounce carving leather from the "cattle group" will typically weigh about 45 grams. When such a blade is put into motion in an effort to strike a bothersome fly, there is usually sufficient mass to accomplish the desired goal—even if only a peripheral part of the blade should strike the fly. Expressed in other words, if a fly is struck by any part of a rapidly moving blade 12, the fly will usually no longer be a problem. And, whenever the handle is about three times as long as the length of its associated blade, the proportions for a flyswatter in accordance with this invention will be generally correct.

The device 10 may also serve as a relatively innocuous tool for defending a pedestrian or jogger from a bothersome dog. That is, a handle about 18 inches long and a blade about 6 inches long should provide an adequate length for preventing the approach of a dog to within biting distance of someone's ankles. And, because the device is shaped like a conventional flyswatter, no one should think it too unusual that a pedestrian might be seen to be carrying such a device when walking on public streets. Furthermore, the owner of a dog should be less likely to be offended if the dog is "discouraged" with a flyswatter instead of being thwarted with something as massive as a baseball bat. And, while a wooden handle will likely only weigh two or three ounces, it could also be useful to discourage an attacker other than a dog.

While several embodiments of the invention have been disclosed herein, it should be apparent to those skilled in the art that further variations are feasible——and they should be understood as being encompassed by the concept disclosed herein. For example, certain dimensions may be slightly altered in order to satisfy a particular person's artistic preferences—without departing from the general concept of this invention. With regard to the leather thong 28, however, it is believed that the tensile strength of such a thong should be at least as great as that of a common boot lace—if someone wishes to have the advantage of using the thong and handles as part of a tourniquet. Also, a wide thong would be preferable to a narrow thong, if such a thong is to be employed as part of a tourniquet (so as to minimize any potential bruising of tissue by virtue of applying too much tension). And, other variations may occur to those who would prefer a slightly heavier or lighter device, etc. Accordingly, this disclosure is not meant to be limiting, and the invention should be understood to be measured only by the terms of the claims which are appended hereto.

What is claimed is:

1. A combination tool having the external configuration of a flyswatter when in its assembled condition, comprising:

(a) a generally planar blade having an approximately rectangular shape and being generally devoid of perforations but having an aperture near one edge thereof for receiving a fastener, and the blade being formed of a leathery material having sufficient stiffness as to be essentially self-supporting, and the blade being decorated and being treated with a water-repellant compound so as to render it impervious to moisture and to preserve the decoration, whereby the blade may be repeatedly rinsed with water for cleaning purposes;

(b) a rigid handle having a length about three times as long as the length of the blade, and the first end of said handle having a longitudinal slot of sufficient thickness to snugly receive the blade within said slot, and the orientation of the slot being generally parallel to the longitudinal axis of the handle so as to create two cantilevered end portions that lie respectively above and below the slot, and there being a transverse bore through the two cantilevered end portions at a location to coincide with the blade aperture when the blade is inserted fully into the slot; and (c) a mechanical fastener for insertion into the transverse bore so as to removably attach the blade to the elongated handle by passing through the juxtaposed openings that are defined by the bore and the blade aperture.

2. The device as claimed in claim 1 wherein the slot has a thickness of about 1/10 inch.

3. The device as claimed in claim 1 wherein the planar blade has an area of about 25 square inches.

4. The device as claimed in claim 1 wherein the mechanical fastener comprises a threaded post and a matching barrel which can be manually engaged and disengaged without special tools, whereby the tool may be separated into its principal parts and recombined at will.

* * * * *